April 10, 1962  J. W. WELLS  3,029,071
COMPOSITE BELLEVILLE SPRING
Filed Jan. 11, 1961

THICKNESS
2t

THICKNESS
2t

SINGLE WASHER
THICKNESS 2t

COMPOSITE WASHER
THICKNESS 2t

Two WASHERS
IN PARALLEL
THICKNESS t

LOAD

SINGLE WASHER
THICKNESS t

DEFLECTION

INVENTOR
JOSEPH W. WELLS

BY Scrivener & Parker
ATTORNEYS 3,029,071
COMPOSITE BELLEVILLE SPRING
Joseph W. Wells, 24 Leominster Road, Bristol, Conn.
Filed Jan. 11, 1961, Ser. No. 81,980
3 Claims. (Cl. 267—1)

This invention relates to Belleville springs, which are well known frusto-conical shaped washers of the type and structure disclosed in United States Letters Patent No. 75,970 to Belleville, and it is the principal object of this invention to provide a Belleville spring which will sustain a greater load without setting, or otherwise failing, than another Belleville spring having the same dimensions including thickness.

Figure 1:
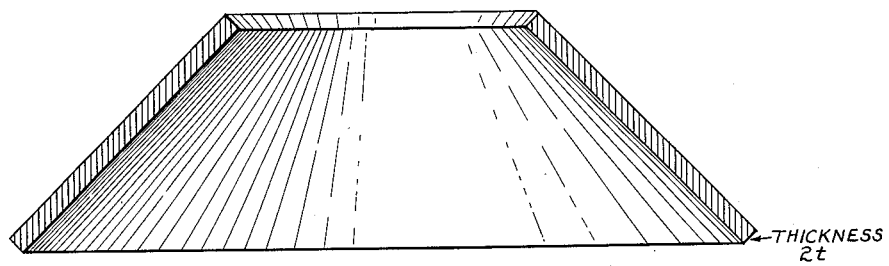
Figure 2:
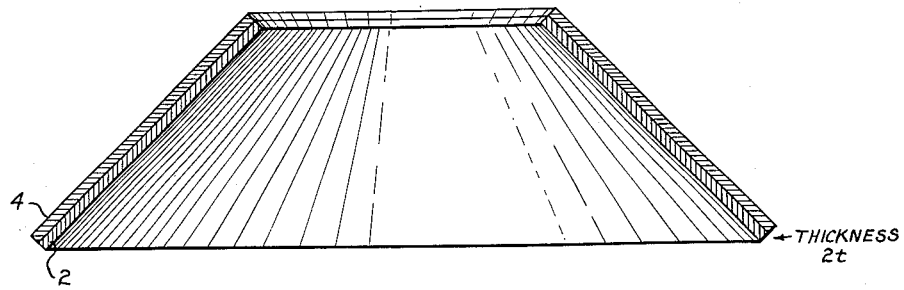
Figure 3:
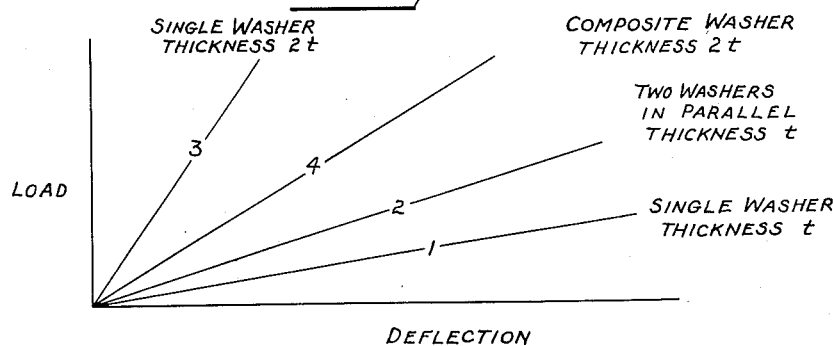

The invention is described in the following specification and is illustrated in the accompanying drawing, in which:

FIG. 1 is an axial cross sectional view through a Belleville washer of known and conventional construction;

FIG. 2 is a similar view showing a Belleville washer constructed in accordance with this invention, and FIG. 3 is a graph showing the load-deflection characteristics of the spring provided by the invention in comparison with other Belleville springs Belleville springs, or washers as they are often called, have heretofore been formed into their frusto-conical shape from a single piece of spring metal strip. Such springs will sustain a given load without setting, depending upon the stress As the thickness of material is increased in order to sustain a higher load, the deflection decreases with the same stress. For this reason, these springs are often used in parallel, by which it is meant that a number of Belleville springs are stacked in concentric relation with their radii parallel and inclined in the same direction. When used in this way, the load carrying capacities of the stacked washers are additive. In FIG. 1 of the drawings there is illustrated a Belleville spring of known and conventional form, the same being a unitary body of frusto-conical shape formed from spring steel strip. This spring will sustain a load without setting, and this load is known or may be calculated.

It is well known at this time that thin spring material, such as strip or wire, has a higher freedom from decarburization and higher physical properties, such as strength and hardness, than thick material. In this connection the term "thin material," as used in this specification and in the accompanying claims, means spring strip material, preferably but not necessarily cold rolled, having a thickness less than ⅛ inch, while the term "thick material" means cold or hot rolled spring strip material having a thickness of ⅛ inch or greater.

In accordance with the invention I utilize the known advantages of thin material, as well as the known ratio of the thickness of the material of a Belleville spring to its capacity to sustain a loan without setting, to provide a composite Belleville spring formed from two or more pieces of thin material nested together and integrally connected together. Such a Belleville spring, as provided by the invention, is disclosed in FIG. 2 of the drawings and comprises a composite spring formed of two frusto-conical bodies 2, 4 each formed from thin material which are nested together and integrally connected together to form a unitary Belleville spring. The two springs 2, 4 may be connected by silver soldering over their entire contracting surfaces and this soldering may be done during the hardening process. Alternatively, the two springs may be connected by spot-welding through the aligned and abutting neutral axes of the two springs.

It has been found that the load-deflection curve of a Belleville spring made of two washers, each formed of thin material, these being integrally connected together to form a single, unitary Belleville spring, will be within the elastic limit exactly as if the spring were made of one solid piece. The composite spring made of two pieces of thin material will be capable of sustaining a higher stress than a spring made of a single piece of material having the same thickness as the composite spring, and, consequently, the composite spring will sustain a greater load without setting than the single washer made of thick material having a thickness equal to that of the composite spring provided by the invention. In addition to this advantage of the composite spring, the thin material has the added advantages of greater freedom from decarburization and higher physical properties.

The energy provided by a Belleville spring having the structure provided by this invention, in comparison with that provided by other Belleville springs, is illustrated graphically in the load-deflection diagram of FIG. 3. Curve 1 of this diagram shows the load-deflection characteristic of a single Belleville spring formed of "thin material" having thickness $t$. Curve 2 shows that two Belleville springs in parallel and having total thickness $t$ have twice the load, with the same deflection, as a single spring having the same thickness, this being illustrated by a comparison of curves 1 and 2. Curve 3 illustrates the load-deflection characteristics of a single spring formed of "thick material" having thickness $2t$, and shows that doubling the thickness increases the load roughly according to the cube of the thickness, but allows less deflection beacuse of the higher stress and inferior qualities of the thick material in relation to those of thin material. Curve 4 illustrates the load-deflection characteristics of a composite Belleville spring formed in accordance with this invention. This curve shows, in comparison with the other curves, that a composite spring, according to the invention, gives almost the same load as the double thickness washer of curve 3, which is formed from a single piece of thick material, and almost the same deflection as the spring illustrated by curve 2, which is formed of two springs in parallel having the overall thickness $t$. It will be seen from these curves that area under the load-deflection curve 3 of the composite spring provided by the invention is greater than the area under any of the other load-deflection curves indicating that the composite spring therefore has greater energy than the other springs.

While I have described and illustrated one form which my invention may take, it will be apparent to those skilled in the art that other embodiments, as well as modifications of that disclosed, may be made and practiced without departing in any way from the spirit or scope of the invention, for the limits of which reference must be made to the appended claims.

What is claimed is:

1. A spring comprising a plurality of Belleville washers stacked in parallel and integrally connected with each other through their aligned and abutting neutral axes to form an integral nested composite structure and act as a single washer, each of said washers being formed of spring metal having a thickness no greater than ⅛ inch.

2. A spring comprising a plurality of Belleville washers stacked in parallel and integrally connected with each other through their aligned and abutting neutral axes to form an integral nested composite structure and act as a single washer, each of said washers being formed of cold rolled spring metal having a thickness no greater than ⅛ inch.

3. A spring as set forth in claim 1 wherein said washers are integrally connected with each other throughout their entire contacting surfaces.

References Cited in the file of this patent
UNITED STATES PATENTS

| | | |
|---|---|---|
| 2,482,449 | Wells | Sept. 20, 1949 |
| 2,655,935 | Kinzbach | Oct. 20, 1953 |
| 2,660,913 | Frisby | Dec. 1, 1953 |

FOREIGN PATENTS

| | | |
|---|---|---|
| 457,925 | Germany | Mar. 27, 1928 |